May 21, 1946.        S. A. CAMPANA        2,400,484
CAN COOLER LOADING MACHINE
Filed July 1, 1942        7 Sheets-Sheet 7

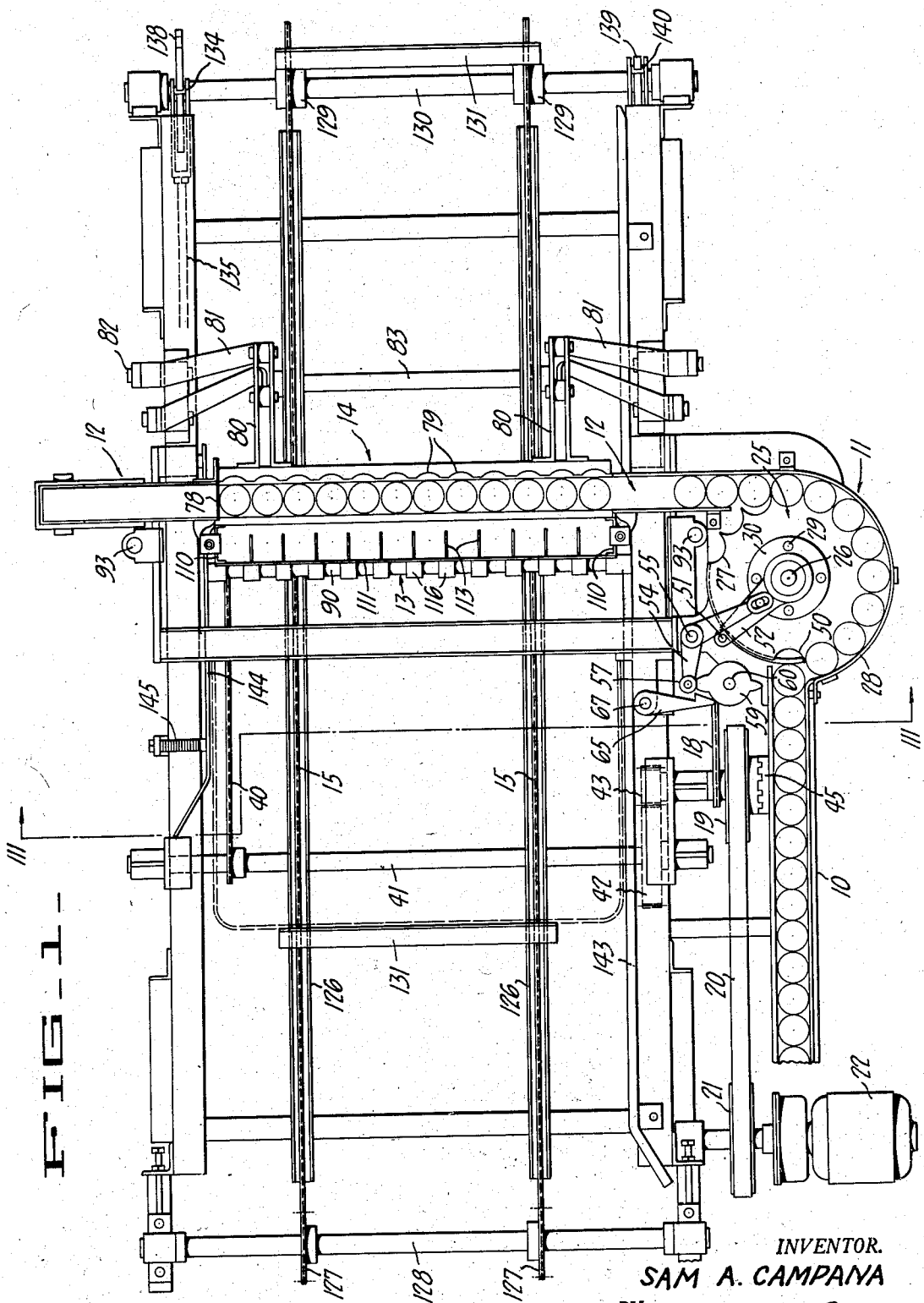

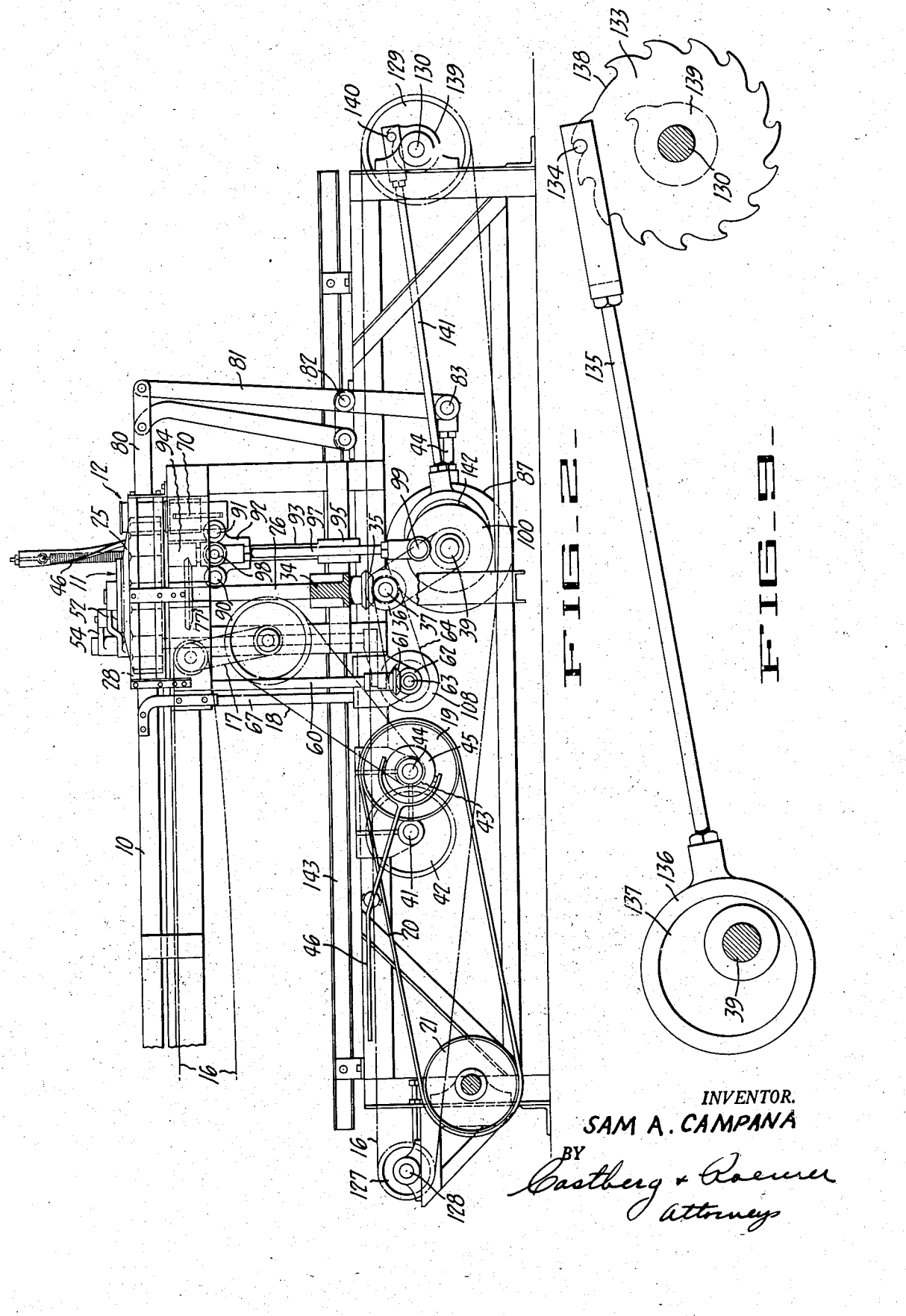

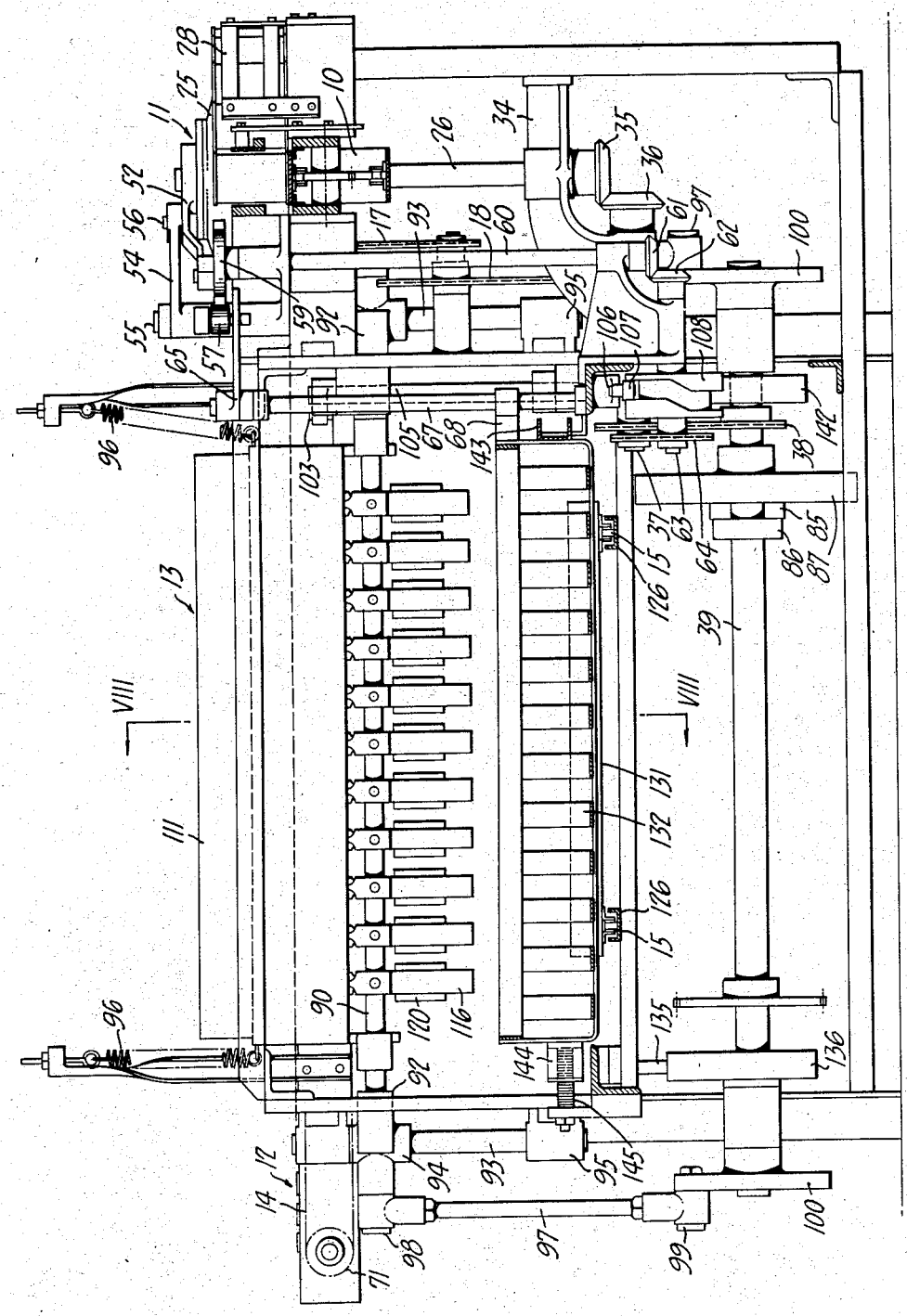

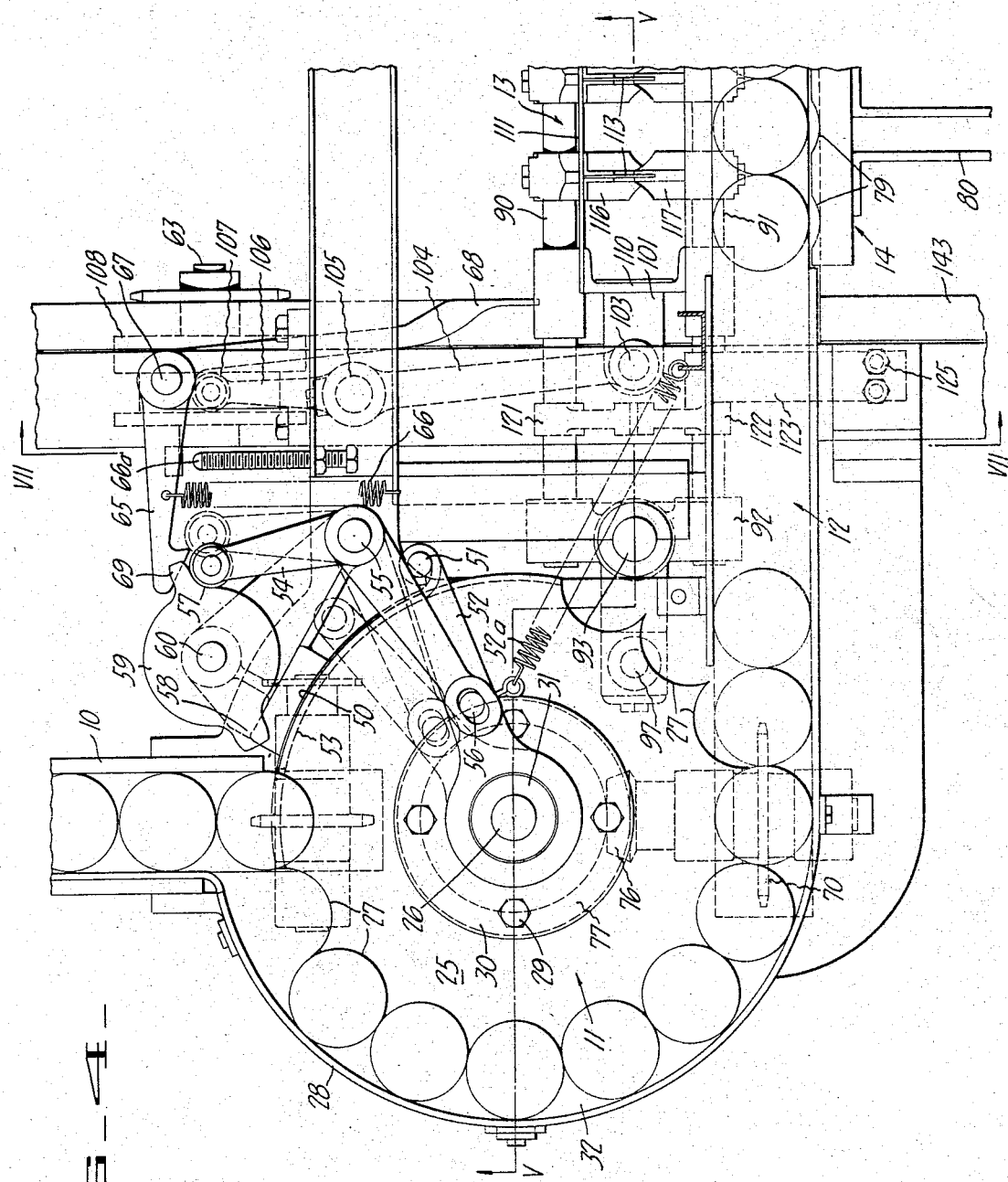

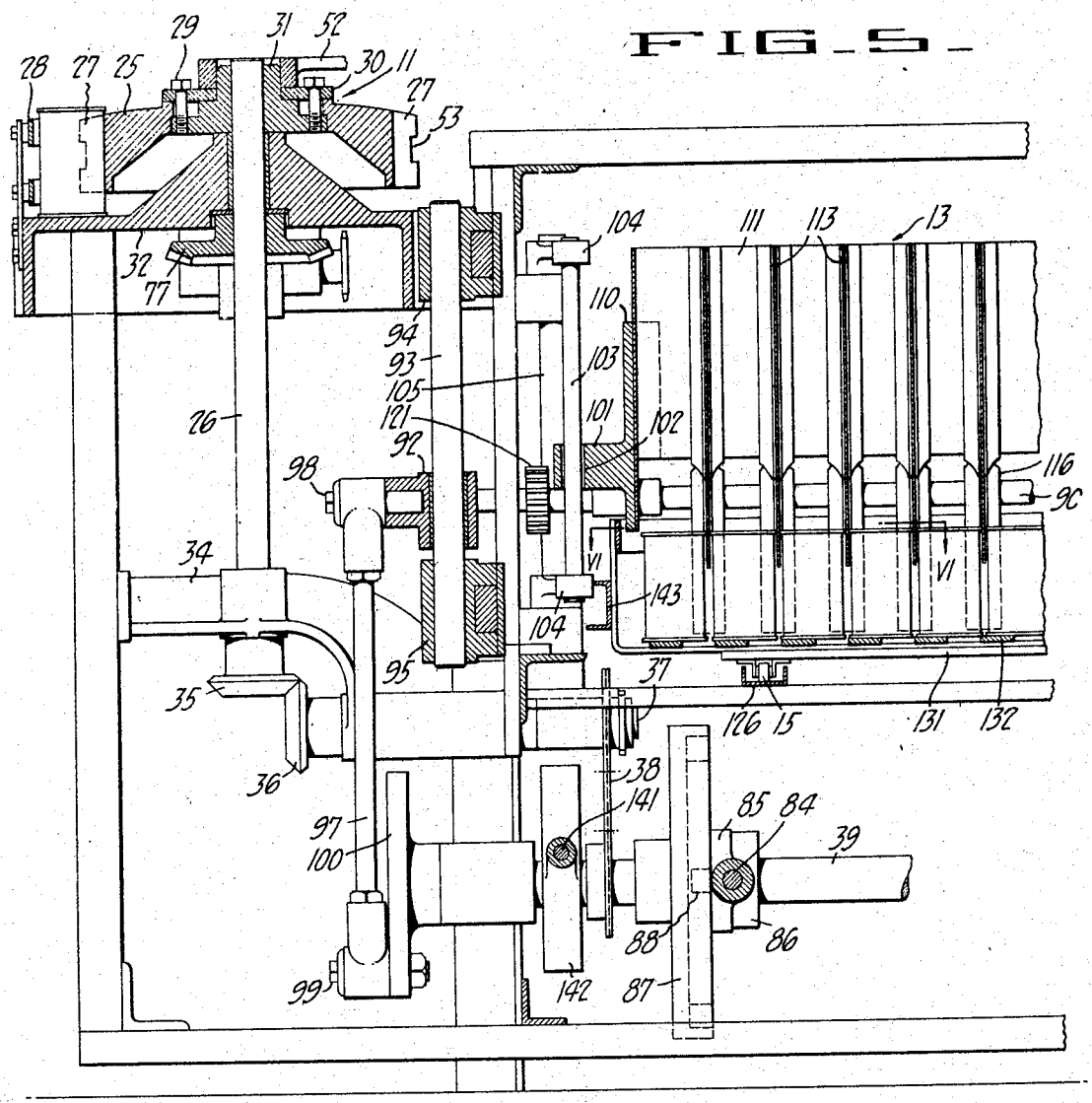
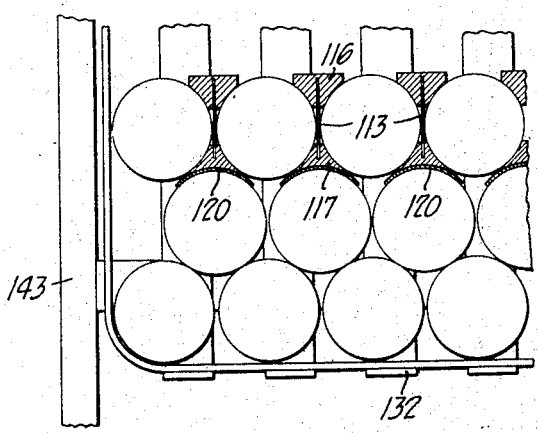

INVENTOR.
SAM A. CAMPANA
BY
Castberg & Roemer
attorneys

Patented May 21, 1946

2,400,484

UNITED STATES PATENT OFFICE 2,400,484

CAN COOLER LOADING MACHINE

Sam A. Campana, San Francisco, Calif.

Application July 1, 1942, Serial No. 449,221

9 Claims. (Cl. 226—14)

The present invention relates to machines for loading can coolers, or more particularly to a machine for receiving cans as they are carried by a conveyor or the like, counting them and arranging them in rows of predetermined numbers, and then depositing them in a container.

It is customary in the canning of fish and other foods to subject the filled and sealed cans to a cooking temperature and thereafter to subject the cans to the atmosphere for cooling before they are labeled and packed into boxes or cartons for shipping. To facilitate handling of the cans before they are cooked and also during their cooling, they are placed in large metal flats or baskets, known as can coolers, in which they remain until they are cooled and transported to the labeling machine.

It is the object of the present invention to provide a machine for receiving cans from a conveyor, which may deliver them from a seamer or the like, and for depositing them compactly and efficiently in a cooler entirely automatically.

A further object of the invention is the provision of means for depositing cans in a cooler one row at a time and for automatically advancing the cooler the necessary distance between rows and also for staggering the rows sufficiently to accommodate the maximum number of cans in each cooler.

A still further object of the invention is the provision of means in a machine of the character described for counting cans and arranging them in rows to be deposited in a cooler, the count in alternate rows varying one can to enable the staggering of the rows for compactness.

Various other objects and advantages of this invention are made apparent in the following specification, wherein reference is made to the accompanying drawings, which illustrate a machine embodying the invention.

In the drawings—

Fig. 1 is a plan view of a machine embodying the present invention;

Fig. 2 is a side elevation of the machine illustrated in Fig. 1;

Fig. 3 is a vertical sectional view taken on the line III—III of Fig. 1;

Fig. 4 is an enlarged detail view in plan of the turret and associated mechanism which is illustrated in Fig. 1;

Fig. 5 is a vertical sectional view taken on the line V—V of Fig. 4;

Fig. 6 is a horizontal fragmentary section taken on the line VI—VI of Fig. 5;

Fig. 9 is an enlarged detail view of the cooler conveyor advancing mechanism shown in Fig. 2.

Figure 7:
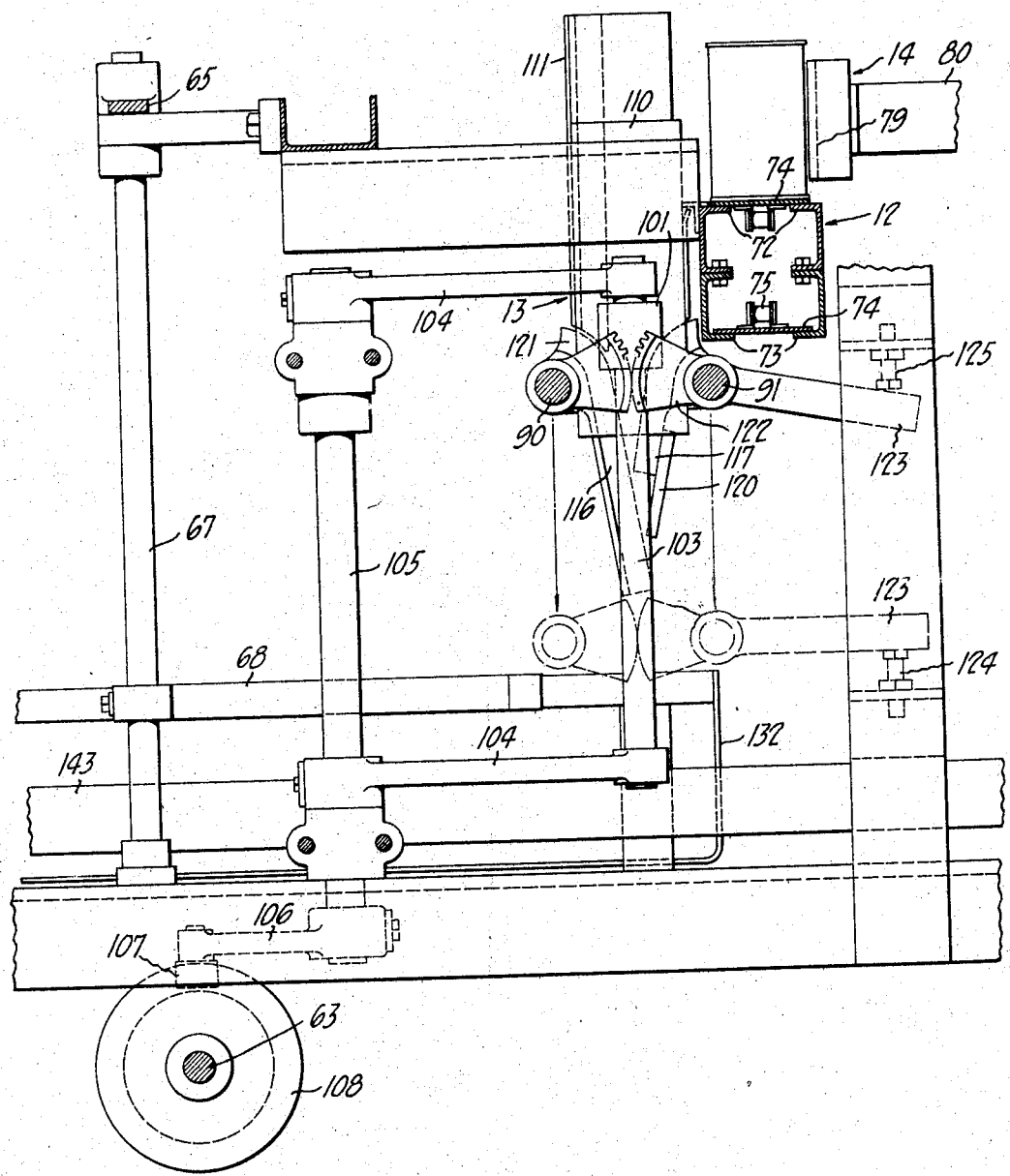
Fig. 7 is a vertical sectional view taken on the line VII—VII of Fig. 4.

Referring first to Figs. 1 and 2, the machine of the present invention is illustrated as receiving cans from a conveyor 10. The cans are delivered from this conveyor to a turret, generally indicated at 11, which counts off the cans in groups of predetermined numbers, as it moves them through an arc to deliver them to a conveyor 12 which travels transversely of the machine and at right angles to the conveyor 10, and carries these groups of cans into a position opposite a series of vertical chutes or hoppers which are a part of an elevator 13. When each can in such a group is aligned with one of the hoppers of the elevator 13, a pusher bar, generally indicated at 14, advances to contact the group of cans and slide each can into its respective hopper in the elevator. At this time the elevator descends and deposits the cans contained by it into a cooler which is supported by a pair of conveyor chains 15 which pass beneath the elevator and are operated to move the cooler forwardly one step each time that a group or row of cans has been deposited in it. The elevator automatically releases the cans at the bottom of its vertical travel, and closes automatically before its ascent in order to retain the cans which are next deposited in its hoppers. The elevator also has a movement from side to side during its descent and ascent so that alternate rows of cans are staggered to enable the placing of a maximum number of cans in a cooler of a given size.

The conveyor 10 is of conventional construction, and consists of a belt or metallic conveyor comprising chain links, each carrying a small metal plate to form a level surface for supporting the cans on top of its upper flight. The path of this conveyor is indicated by the broken line 16 in Fig. 2. It is continuously driven, by a motor which operates all of the moving parts of the machine, through a series of chains and sprockets indicated at 17 and 18, the chain 18 being driven by a sprocket which is fixed to an idler pulley 19 driven by a belt 20 leading over a motor pulley 21 constantly driven by the motor illustrated at 22 in Fig. 1.

The details of construction of the turret 11 are most clearly illustrated in Figs. 2, 4 and 5. The turret includes a head 25 supported by a vertical rotatable shaft 26. Around the major portion of the periphery of the turret are a plurality of can-receiving recesses 27 which cooperate with an arcuate guard rail 28 to receive cans one at a time from the conveyor 10, swing them 180 degrees through an arcuate path, and deliver them on to the conveyor 12. In order that the turret head 25 may be accurately timed with the operation of the elevator and other parts of the machine which are driven by the same power source, the head is clamped by means of bolts 29 and an annulus 30 to a separate hub portion 31, which in turn is keyed or splined to the rotatable shaft 26. This shaft passes through a bed plate 32 suitably supported by the framework of the machine and is journaled adjacent its lower end in a bracket 34. A bevel gear 35 at the lower end of the shaft is driven by a similar gear 36 on a stub shaft 37 connected by sprockets and a chain 38 to a main shaft 39. The main shaft 39 is driven through a chain 40, shown in Fig. 1, and trained over a sprocket on the shaft 41 which extends transversely of the machine and is connected by gears 42 and 43 to the same shaft 44 that supports the pulley 19. This pulley 19, which normally idles on the shaft 44, may be connected thereto to drive the machine through the medium of a clutch 45 controlled by an operating lever 46, as shown in Figs. 1 and 2.

When the clutch is engaged, the entire machine is operating and the turret head 25 rotates continuously. As the can coolers being loaded are of a width just to receive twelve cans, the recesses 27 in the turret head are twelve in number, and when twelve cans have been received by the turret, the smooth or unrecessed portion of its periphery intercepts the line of cans on the conveyor 10 and prevents delivery of cans to the machine for a brief period of time during disposal of the cans last counted. As alternate rows of cans are staggered in the cooler, every other row therein contains eleven cans. In order that the turret head will count eleven cans rather than twelve on every second rotation, a gate is provided for closing the twelfth recess 27 in the turret head. This gate is shown at 50 in Fig. 4, and consists of an arcuate strap disposed substantially parallel with the periphery of the turret head and having one end curled about and pivotally supported by a pin 51 which depends from a lever 52 which is mounted for swinging movement about the center of rotation of the turret by having its inner end embracing the turret head 31, as shown in Figs. 4 and 5. A tension spring 52a engaging the lever 52 urges the gate toward its open position. The free end of gate 50 is slidable in a groove 53 formed in the periphery of the turret head and intercepting the points between the recesses 27, as shown in Fig. 5, so as to form a continuous recess which receives the gate during rotation of the turret. On alternate rotations of the turret the lever 52 is swung to the dotted line position indicated in Fig. 4 to advance the free end of the gate 50 across the path of the cans entering the turret from the conveyor 10, thus closing the twelfth recess 27 and intercepting the can which would have entered that recess and causing the turret to deliver eleven cans to the conveyor 12 rather than twelve. This closing of the gate is accomplished by a bell crank 54 pivoted on pin 55. One end of this bell crank is connected by a pin and slot connection 56 with the lever 52, and its opposite end carries an anti-friction roller 57 which is engaged by a rise 58 on the periphery of a circular cam 59. The cam 59 is mounted on the upper end of a shaft 60, which shaft, as shown in Fig. 2, carries a bevel gear 61 at its lower end in mesh with a bevel gear 62 on the end of a stub shaft 63, which is driven by a chain 64 and suitable sprockets from the stub shaft 37. The shaft 60 which carries and rotates the cam 59, operates at half the speed of the turret, and the cam is timed to close the gate over the twelfth recess for every other rotation of the turret. The gate 50 is also employed as a safety stop to prevent the feeding of cans to the turret whenever there is no cooler present beneath the elevator to receive the cans. To hold the gate closed a pawl shown at 65 in Fig. 4 is urged by a spring 66 against a stop 66a to engage the pin which supports the roller 57 at the end of the bell crank 54 and hold the bell crank in its gate closing position. This pawl is carried at the upper end of a vertical shaft 67, and fixed to the lower end of this shaft is an arm 68 having an end which normally projects into the path of the coolers as they are conveyed beneath the elevator from which they receive the cans. The presence of a cooler beneath the elevator urges the arm 68 to the position illustrated in Fig. 4, thus turning the shaft 67 slightly and holding the pawl 65 against the tension of the spring 66 in a position where it will not engage and retain the lever 54 in its gate closing position. If, however, no cooler is present beneath the elevator the end of the arm 68 swings into the path of the coolers, permitting the pawl to assume a position where the pin on the lever 54 will snap into place the first time that the lever is operated to close the gate by the rise 58 on the cam 59. As this would take place normally only after the delivery of eleven cans to the turret and the safety lock would thus fail to operate on alternate rotations of the turret, a second rise 69 is provided on the cam 59 for closing the gate, but as this rise is smaller in width than the rise 58 it closes the gate only after the twelfth can has been received and for no purpose other than to present the arm 54 to the pawl 65 in the event that there is no cooler in position to receive the cans.

The conveyor 12, which is of conventional construction and consists of chain links each carrying a rectangular metallic plate, is trained over a drive sprocket 70, as shown in dotted lines in Fig. 4, at one end and over an idler sprocket 71, as shown in Fig. 3. In order to prevent the lower flight of this conveyor from sagging and thus interfering with other mechanisms, the entire conveyor where it crosses in front of the elevator is housed, as shown in Fig. 7, by two pairs of angle irons bolted together to form inwardly projecting top ledges 72 supporting the plates of the upper flight of the conveyor and bottom ledges 73 supporting the plates of the lower flight of the conveyor, the conveyor plates being shown at 74 and the chain links to which they are secured at 75. The conveyor driving sprocket 70 is keyed to a shaft on the inner end of which is fixed a bevel pinion 76, which, as shown in dotted lines in Fig. 4, meshes with a bevel gear 77 (see also Fig. 5) keyed to the shaft which supports and rotates the turret head so that the conveyor is driven constantly when the turret is in operation. The cans received by the conveyor 12 are stopped by a plate 78 extending across the conveyor, as shown in Fig. 1, in positions opposite the chutes by which they are to be received in the elevator 13. The pusher bar 14, which is provided with arcuate recesses 79 to register with and assist in guiding the cans into their respective chutes, is then advanced over the conveyor to slide the cans off of it and into the elevator. This pusher bar has a pair of forwardly extending brackets 80, the outer ends of which are pivoted to the upper ends of a pair of levers 81 mounted on fulcrum pins 82 and pivotally connected at their lower ends with a bar 83 which extends transversely of the machine and connects the two levers together for simultaneous movement. Adjacent the center of this bar a connecting rod 84 extends rearwardly and has a bifurcated end 85 (see Figs. 3 and 5) which embraces the main shaft 39 between a collar 86 and a box cam 87. A pin 88 (shown in dotted lines in Fig. 5) projects into the cam so that upon rotation of the shaft the connecting rod 84 is reciprocated to swing the levers 81 to advance and retract the pusher bar, the box cam 87 being contoured to time the operation of the pusher bar with relation to the operation of the turret which feeds the cans toward their position in front of the elevator.

The individual hoppers of the elevator by which the cans are received are effectively closed at their lower ends by two groups of elements presently to be described, each group being supported on one of a pair of parallel shafts 90 and 91 (see Figs. 2, 4 and 7) which, as best illustrated in Figs. 2 and 5, are journaled at their opposite ends in castings 92 which retain the shafts in spaced parallel relationship extending transversely of the machine and which are mounted for vertical sliding movement on posts 93 secured in vertically aligned brackets 94 and 95. The weight of the elevator is counter-balanced by springs 96, best shown in Fig. 3, and it is raised and lowered during the operation of the machine by a connecting rod 97 pivoted to the casting 92 at its upper end by means of a pin 98 and connected at its lower end with a crank pin 99 carried on a crank disc 100, which is keyed to the outer end of the main shaft 39. The force which raises and lowers the elevator is preferably balanced by duplication of this mechanism on the opposite side of the machine from that shown. The position of the elevator at the top of its vertical movement is always the same. However, as the rows of cans in the can cooler are staggered the elevator must on every alternate descending movement, shift sidewise a distance equal to half a can diameter and then upon its ascent return to normal alignment for reception of cans. This movement is accomplished by sliding the shafts 90 and 91 axially during vertical travel of the elevator. These shafts are embraced by a casting 101 (see Figs. 4 and 5) which has a central vertical opening 102 embracing and adapted to slide over a vertical post 103. The post 103 is engaged and supported at its upper and lower ends by identical levers 104, both fixed to a vertical rotatable shaft 105 which at its lowermost end carries a lever 106 with a downwardly projecting pin or anti-friction roller 107 (see Figs. 2 and 3) which extends into a peripherally grooved cam 108 which is mounted on and driven by the shaft 63 and which is contoured and timed to effect sidewise shifting of the entire elevator during its descent and returned to normal during its ascent on alternate operations.

Figure 8:
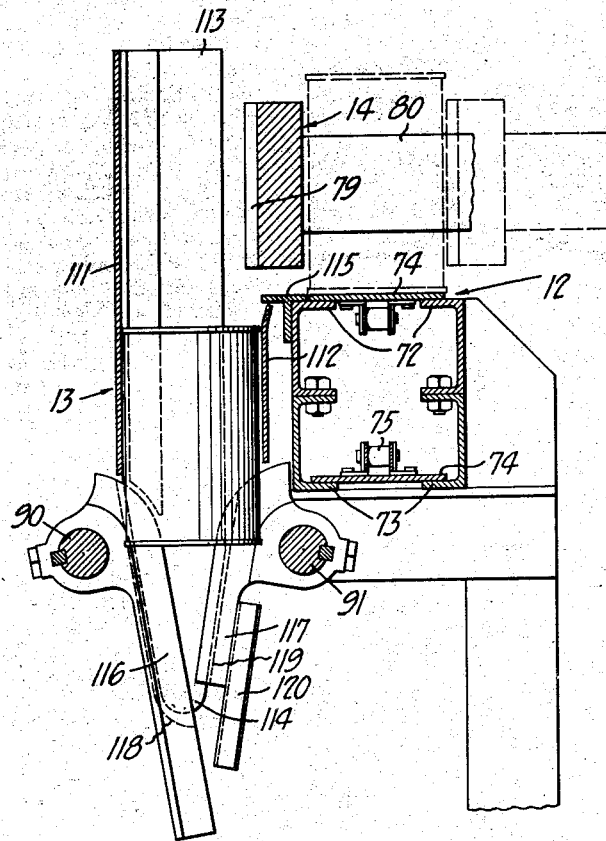
Fig. 8 is an enlarged detail in vertical section taken on the line VIII—VIII of Fig. 3.

The general assembly of the elevator 13 is best illustrated in Figs. 1, 5 and 8, wherein the castings 101 are shown each as supporting a vertically disposed, channel-shaped member 110. Extending between these members 110 and supported by them are a back wall 111 and a front wall 112, and the back wall carries a plurality of partitions 113 which extend toward the front wall, terminating just short of it, and depend downwardly, terminating at their lower extremities in tapered ends, such as shown at 114 in Fig. 8. The walls 111 and 112 and the partitions 113 form the hopper portion of the elevator which is divided by the partitions into substantially square reticules of a size to receive a can and in alignment with the positions occupied by the cans when they are advanced off of the conveyor 12 by the pusher bar. A sill 115, as illustrated in Fig. 8, spans the space between the conveyor and the hopper and overlies the upper edge of the wall 112 to facilitate deposit of the cans in the hopper. The bottom of the hopper is effectively closed by fingers 116 and 117 supported in rows on the shafts 90 and 91, respectively, to which they are keyed and also secured against longitudinal movement by a set screw or the like so that upon slight rotation of the shafts 90 and 91 these fingers may be moved either to the closed position illustrated in Fig. 8, or swung from that position to a vertical or open position wherein the can obstructed by them is permitted to gravitate to the cooler by which it is received below the elevator. The fingers 116 and 117 are positioned in alignment with the partitions 113 so that each finger projects partially into two of the reticules formed by the partitions 113. The fingers are shown in cross section in Fig. 6, wherein each finger is illustrated as having two concave sides formed on an arc which is the same as the peripheral contour of the can. Thus, four fingers serve to form a guide which accurately positions the can as it slides downwardly toward the cooler. Both the fingers 116 and 117 are slotted, as indicated at 118 and 119, respectively, to receive the edges of the dividing partitions 113 and to permit them to swing over the tapered lower ends of these partitions, as shown in Fig. 8. When the elevator is in its lowermost position, the lower ends of the fingers 116 stop just above the bottom of the cooler in which the cans are to be deposited. The fingers 117 are, however, terminated considerably short of this point and each finger supports a curved plate 120 which may be formed of thin spring steel or the like, and which is contoured to register with the cans in the row preceding the row which is being deposited. Consequently, when the upper row shown in Fig. 6 is being placed in the cooler, and the fingers 117 swing from their inclined position to their vertical position to release the cans, the plates 120 register with the cans in the row last deposited and urge these cans forwardly in the cooler to insure that they are perfectly aligned and contacting the cans which precede them in order to conserve space.

The mechanism for opening and closing the fingers 116 and 117 is shown in Fig. 7, where the shafts 90 and 91, are illustrated as fitted with gear quadrants 121 and 122, respectively, which mesh with each other. The quadrant 122 carries a tail 123 which upon downward movement of the elevator contacts a stop in the form of an adjustable set screw 124, which during the last part of the downward movement of the elevator effects just sufficient rotation of the shafts to move the fingers to their vertical or open positions. An identical stop 125 contacts the tail 123 during the upward movement of the elevator, thus reversing the rotation of the quadrants and again returning the fingers to their closed or can-receiving positions.

The conveyor chains 15, which support and advance the coolers, have their upper flights supported and guided in channels 126. These chains are trained over sprockets 127 on a shaft 128 at one end of the machine and over sprockets 129 on a shaft 130 at the opposite end of the machine. Feed bars 131 extend transversely of the two chains and are driven by them to engage and advance the coolers 132. The leading edge of the cooler is presented by the feed bar to a position beneath the elevator to receive the first row of cans and the cooler is then advanced a distance equal to the width of a row of cans for each operation of the elevator until it is filled, at which time the cooler conveyor chains 15 are advanced approximately twice this distance, which is sufficient to bring the leading edge of the next cooler into registry beneath the elevator for the reception of the next row of cans deposited. To feed the cans in this manner, the shaft 130 is provided with a toothed wheel 133 (see Figs. 1 and 9), by which it may be driven. A pin 134 resting on top of this wheel and adapted to engage with the teeth thereof, is carried by the end of a rod 135, the opposite end of which carries an eccentric strap 136 which embraces an eccentric 137 fixed to and rotated by the main shaft 39. The action of the eccentric upon each rotation of the shaft 39 causes the pin 134 to engage behind one of the teeth on the wheel 133 and advance the same a distance which effects the movement of the cooler feed the width of one row of cans. As there are fourteen rows of cans in each cooler, the wheel 133 has fourteen teeth and one space, as indicated at 138, in which the pin 134 will be ineffective. When this space is reached a similar but smaller toothed wheel 139, which is also carried by the shaft 130, and which has a single tooth projecting from its periphery, is engaged by a pin 140 identical with the pin 134 and carried by a rod 141 identical with the rod 135, and also driven by an eccentric 142 on the main shaft 39. Thus, when the toothed wheel 133 has advanced the cooler fourteen spaces and becomes inoperative for the fifteenth space, the wheel 139 is timed to effect engagement of its single tooth with the pin 140. As the diameter of this wheel is about half that of the larger one, the can conveyor is advanced approximately twice the usual distance, which is sufficient to bring the second cooler into position to receive its first row of cans and also to advance the large toothed wheel 133 to a position where it will again operate to advance the cooler for the reception of the next thirteen rows of cans. As the coolers travel along the conveyors, one side is guided by the immovable rail 143, as shown in Fig. 1, while on the opposite side a shorter rail 144, which is urged inwardly by springs 145, insures perfect alignment of the cooler as it passes beneath the elevator.

While the present invention has for the purpose of illustration been disclosed in the form of a machine constructed for the specific purpose of arranging cans in a cooler, it is readily adaptable to other uses, and, in fact, for any use where cans or similarly shaped objects are to be arranged in orderly manner in any type of container or on any surface.

The foregoing disclosure is intended in no way to limit the invention to the specific mechanisms and constructions shown, but only to illustrate the invention which is defined by the appended claims.

Having thus described my invention, what I claim and desire to secure by Letters Patent is:

1. In a machine for loading can coolers or the like, means for receiving cans from a conveyor and delivering them to a second conveyor in groups of predetermined numbers comprising, a rotating turret having a plurality of recesses formed throughout a portion of its periphery, each to receive and advance one can, a gate, and means to close said gate across the last recess on alternate rotations of the turret to effect delivery of groups varying alternately one can in number.

2. In a machine for loading can coolers or the like, means for receiving cans from a conveyor and delivering them to a second conveyor in groups of predetermined numbers comprising, a rotating turret having a plurality of recesses formed throughout a portion of its periphery, each to receive and advance one can, a gate associated with said turret, means to close said gate across the last recess on alternate rotations of the turret to effect delivery to the second conveyor of groups varying alternately one can in number, means to deliver said groups of cans into an advancing cooler, and means to retain said gate in a closed position in the absence of a cooler from a can receiving position.

3. In a machine for loading can coolers or the like, means for receiving cans from a conveyor and delivering them in groups of predetermined numbers comprising a rotating turret having can receiving recesses in its periphery, a gate associated with the turret and slidable to close one of said recesses, and means to operate said gate automatically on alternate rotations of the turret to effect delivery of groups varying alternately one can in number.

4. In a machine for loading can coolers or the like, means for receiving cans from a conveyor and delivering them in groups of predetermined numbers comprising a rotating turret having can receiving recesses in its periphery, said turret having a groove formed in its periphery, an arcuate gate member associated with the turret and received by said groove, and means to slide the gate to a position obstructing entrance of cans into the turret.

5. In a can cooler loading machine, a turret for receiving cans from a conveyor and delivering them in groups toward an elevator, means for advancing coolers beneath the elevator to receive cans therefrom, a gate for obstructing entrance of a single can upon alternate rotations of the turret, and means operating automatically to close said gate upon the absence of a cooler from a can receiving position beneath the elevator.

6. In a can cooler loading machine, an elevator, means to raise the elevator to position for receiving cans from a conveyor and to lower the elevator to a position to deposit the cans in a cooler, said elevator comprising an elongated hopper adapted to receive a row of cans, can supporting members carried by the elevator and inclined toward each other to support and retain the cans in the hopper, means to swing said supporting members away from each other as the elevator descends whereby the cans will gravitate into the cooler as the elevator reaches its lower position, and means carried by one side of said supporting members to engage a previously deposited row of cans as the supporting members swing away from each other whereby the engaged cans will be aligned and urged forwardly.

7. In a can cooler loading machine, an elevator, means to raise the elevator to position for receiving cans from a conveyor and to lower the elevator to a position to deposit the cans in a cooler, said elevator comprising an elongated hopper adapted to receive a row of cans, can supporting members carried by the elevator and inclined toward each other to support and retain the cans in the hopper, means to swing said supporting members away from each other as the elevator descends whereby the cans will gravitate into the cooler as the elevator reaches its lower position, and a plurality of curved plates carried by said supporting members and spaced to engage one with each can in a previously deposited row as the supporting members swing away from each other whereby the engaged cans will be held out of the path of the descending cans.

8. In a machine for loading a can cooler or the like, an elevator under which the cooler may pass, conveying means, a counting device associated with said conveying means for counting cans and having means for varying the count of cans in alternate rows of cans, means for advancing the cans toward the elevator in rows varying alternately one can in number and means for lowering the elevator to dispose the cans in the cooler.

9. In a machine for loading a can cooler or the like, an elevator under which the cooler may pass, conveying means, a counting device associated with said conveying means for counting cans and having means for varying the count of cans in alternate rows of cans, means for advancing the counted cans toward the elevator in rows varying alternately one can in number, means for lowering the elevator to deposit the cans in the cooler, and means for moving the elevator sidewise during its descent as it deposits every other row of cans.

SAM A. CAMPANA.